Dec. 28, 1954  A. R. GARABRANT ET AL  2,698,320
METHOD FOR POLYMERIZING ISOBUTYLENE WITH POWDERED Al Cl₃
Filed Nov. 26, 1952
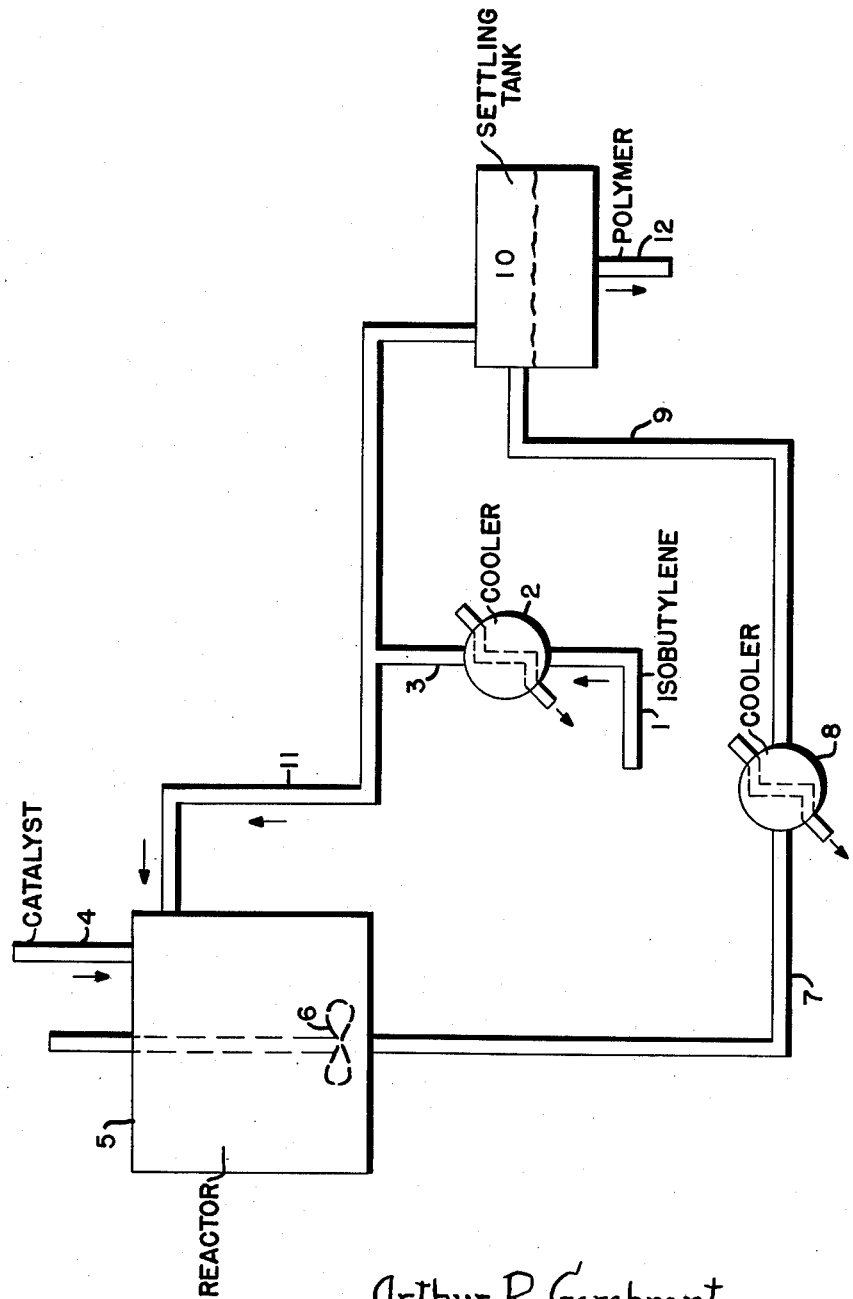
Arthur R. Garabrant
Hans G. Goering    Inventors
Helmuth G. Schneider
By W. H. Smyers   Attorney

United States Patent Office 2,698,320
Patented Dec. 28, 1954

2,698,320

METHOD FOR POLYMERIZING WITH POWDERED AlCl₃

Arthur R. Garabrant, Westfield, Hans G. Goering, Elizabeth, and Helmuth G. Schneider, Westfield, N. J., assignors to Standard Oil Development Company, a corporation of Delaware Application November 26, 1952, Serial No. 322,616

6 Claims. (Cl. 260—94.8)

This invention relates to the polymerization of substantially pure isobutylene by means of finely divided solid aluminum chloride and more particularly relates to the preparation of high molecular weight polymers 1,500–25,000 M. W. by such reaction.

It is well known that isobutylene can be polymerized by means of boron fluoride at +32 to —90° F. Such a system has many disadvantages. The catalyst causes corrosion of the equipment and gives low yields by virtue of vapor phase polymerization due to the volatility of the catalyst. It is limited to batch operation since poisons build up if the process is carried out continuously with recycle of unreacted isobutylene. Furthermore the process is expensive and control of the reaction is difficult. In addition the product contains fluorine which makes it unacceptable for certain uses.

Attempts to use aluminum chloride to avoid the many disadvantages of boron fluoride have not been too successful. In the first place, when solid aluminum chloride has been used it has not been possible to secure polymers having molecular weights above 1500 Staudinger. Higher molecular weight products can only be obtained if the aluminum chloride is dissolved in an inert solvent. In this manner polymers having molecular weights up to 200,000 to 350,000 Staudinger can be obtained at low temperatures of the order of —100° to —150° F. Such a process, however, is expensive because of the necessity for having facilities for preparing the catalyst, separating the catalyst solvent from the recycle stream and purifying the solvent before re-use. The reasons why it has not been possible to develop a successful process for preparing high molecular weight polymers of isobutylene with solid aluminum chloride has been the lack of control of the reaction to consistently give a product of the desired molecular weight, ineffective means for removing the heat of polymerization, and the fouling of the reactors.

It is therefore the main object of this invention to provide a process for the preparation of high molecular weight isobutylene polymers by the use of finely divided solid aluminum chloride.

It is a further object of this invention to provide means for more adequately controlling the polymerization of isobutylene when employing solid aluminum chloride as the catalyst.

It is a still further object of this invention to provide more effective means for removing the heat of reaction when polymerizing isobutylene in the presence of solid aluminum chloride.

It is still another object of this invention to provide means for preventing the fouling of the reactor surfaces with catalyst and polymer when polymerizing isobutylene with solid aluminum chloride.

These and other objects of this invention are accomplished by carrying out the polymerization of isobutylene in the presence of a small amount of finely divided solid aluminum chloride having a particle size diameter of less than 0.2 mm. (60 mesh) at a temperature above —67° F. in a reaction zone provided with means for maintaining the aluminum chloride dispersed throughout the reaction zone.

The polymerization reaction is preferably, although not in all cases, carried out at temperatures below atmospheric. When other factors are equal the lower the temperature, the higher the molecular weight of product. Generally temperatures are employed within the range of —67° F. (preferably —40° F.) to +32° F.

The temperature should not go below —67° F. since it has been found that at about —58° F. the polymer has a tendency to come out of solution in a highly solvated form and can be handled in conventional equipment. However, as the temperature is lowered the polymer becomes progressively less solvated and will foul the reactor.

The amount of catalyst used is very small, generally from 0.05 to 1% and preferably between 0.1 and 0.5% by weight based on the isobutylene.

The isobutylene used must be substantially pure since the presence of poisons such as butene-1 and butene-2 decreases the molecular weight of the product.

The process may be carried out either batchwise or continuously. Generally continuous polymerization gives slightly lower molecular weight polymer than batch. Temperature is the most important variable in obtaining the desired molecular weight product. It is within the scope of this invention to carry out the process to 70% conversion but conversions of 30 to 50% are preferable.

The invention is desirably carried out in the following manner. Isobutylene is first charged to a precooled reactor and the desired operating temperature attained, either by internal or external cooling. The catalyst is then added and the reaction allowed to continue for at least five to ten minutes but usually for about 30 to 60 minutes or longer if desired. At the end of this time the batch (with or without filtration) is contacted with water to neutralize the catalyst. Unreacted hydrocarbons are stripped from the product solution by heating to 212° F. Higher boiling light ends are stripped from the polymer product at 300°–400° F. and the polymer is identified by molecular weight determination.

When the above process is carried out continuously the feed is charged continuously to a reflux-type reactor or a reactor fitted with external or internal refrigeration with an overflow tube to maintain a constant reactor volume. The conversion level in the reactor is determined by analysis for polymer content of a spot sample of the effluent polymer solution or by viscosity-type analyses or by olefinic analysis of the spent naphtha. The formation of polymer is controlled by regulating the rate of addition of the catalyst. The effluent polymer solution may be filtered and then immediately treated with water or alcohol to kill the catalytic reaction or may be contacted with alcohol and/or water directly after leaving the reaction zone. The polymer solution is finished in the same manner as in the batch process.

It is an important feature of this invention that the catalyst be thoroughly dispersed in the reacting mass and so maintained throughout the reaction. Such dispersion can easily be obtained by violent agitation of the reacting mass. The agitation serves to remove the polymerized isobutylene from the catalyst surface thereby increasing the reaction rate and minimizing heat build up at the catalyst interface. This results in a workable process and an easily controlled reaction. Unless adequate agitation is employed, the catalyst particles will agglomerate and settle out on the sides and bottom of the reactor. This condition is known as fouling and when this occurs the reaction rate is greatly decreased and in many cases the reaction eventually stops. The agitation must be uniform throughout the reacting mass. Areas of poor reaction will have an adverse effect on conversion rate and will provide areas where the catalyst will deposit and foul the reactor.

The polymerization is conducted under conditions where the polymer remains in solution in the unreacted monomer. Polymers of isobutylene having molecular weights up to 18,000 are quite soluble in isobutylene at temperatures above —58° F. Those polymers above 18,000 molecular weight, while being precipitated out are highly solvated and come out of solution to form a gelatinous slurry-like mass which has no tendency to agglomerate at temperatures above —67° F. At —67° F. and below, most of the polymer is precipitated in a non-solvated form which agglomerates and fouls the reactor.

It is a further feature of this invention to make use of the above observation in separating the polymer from the reaction mass. This is accomplished by reducing the temperature of the mixture of polymer and unreacted monomer to a temperature well below −67° F. where 90-95% of the polymer is precipitated. The precipitated polymer is then separated and the low viscosity liquid phase is recycled to the reaction zone. The precipitation may be carried out in the main body of the reactor, or in a quiescent side section, or in a separate piece of equipment such as a refrigerated settling tank, a dewatering extruder, or any other device capable of separating solids from liquids at reduced temperatures.

The manner in which the present invention is carried out will be fully understood from the folowing description when read with reference to the accompanying drawing.

Substantially pure isobutylene is introduced into line 1 and passed to cooler 2 where its temperature is cooled down to below the desired polymerization temperature. This cooled isobutylene is passed by line 3 to recycle line 11 containing liquid recycled isobutylene. This line carries it to reaction chamber 5 where it meets finely divided solid aluminum chloride added through catalyst line 4. (If desired, the catalyst can be added through line 3.) The catalyst may be introduced in any known manner as by jet or star feeder or the like. The catalyst-isobutylene mixture is then introduced into reaction chamber 5 at a rate of about 75 gallons of feed per hour per pound of catalyst which is equivalent to 0.3 wt. percent based on isobutylene and is agitated by stirrer 6 so that the catalyst is maintained in suspension at all times. It is preferable that the reaction chamber 5 be a flat-bottomed cylindrical reactor and that stirrer 6 be as close to the bottom of the reactor as practical in order to maintain a high efficiency in the degree of agitation.

The temperature in the reactor is maintained at about −40° to −60° F. The low molecular weight polymers remain in solution in isobutylene in this temperature range. Any high molecular weight polymers which precipitate are sufficiently solvated so that they do not foul the reactor. A slurry of high molecular polymer in a solution of low molecular weight polymer in isobutylene is withdrawn through line 7 and passed to cooler 8 where the temperature is reduced to below −58° F. This mixture of polymer and liquid isobutylene is then passed by line 9 to settling tank 10 where the solid polymer is allowed to settle from the liquid unreacted isobutylene. In general, the lower the temperature (effluent from cooler 8) the more rapid and complete the separation of polymer from unreacted isobutylene. Hence, settler temperatures below −67° F. are preferred. The isobutylene still contains a small amount of low molecular weight polymer in solution. This solution forms a supernatant liquid which is withdrawn by line 11 and recycled to the reactor 5 without further treatment. Solid polymer is withdrawn from settler 10 by line 12 and subsequently treated for catalyst removal by washing with water, alcohol or the like.

The advantages of the invention will be better understood from a consideration of the following experimental data which are given for the sake of illustration, but without intention of limiting the invention thereto.

EXAMPLE 1

Isobutylene was polymerized at −13° to −22° F. in a 3 liter spherical flask with 0.6 to 0.8% by weight of finely solid aluminum chloride based on isobutylene and agitated with two different types of agitators at two different speeds to determine the effect of agitation on the course of the polymerization. The following data were obtained:

Table I—Effect of agitation on polymerization of isobutylene with solid AlCl₃

Temperature ..................... −13 to −22° F.
Catalyst ........................ 0.6% to 0.8% AlCl₃ on isobutylene.
Reactor ......................... 3 liter spherical flask.

| Agitation | Contact Time, (min.) | Percent Conversion Monomer to Polymer | Extent of Fouling |
|---|---|---|---|
| 2" paddle, 2,500 R. P. M. | 60 | 18 | heavy. |
| Do. | 46 | 25 | Do. |
| 1¼" propeller, 5,000 R. P. M. | 35 | 42 | slight. |
| Do. | 33 | 44 | none. |

The above data clearly show that violent agitation almost completely reduces fouling of the reactor and increases conversion.

EXAMPLE 2

Isobutylene was polymerized at temperatures of −22° to −40° F. in the presence of varying amounts of finely divided aluminum chloride. The following data were obtained:

| Temp., ° F. | Wt. Percent Catalyst Charged | Conversion Rate Percent Isobutylene to Polymer/min. | Molecular Wt. (Staudinger) |
|---|---|---|---|
| −22° | 0.14 | 0.14 | 16,000 |
| −22° | 0.21 | 0.41 | 14,800 |
| −22° | 0.27 | 0.90 | 14,800 |
| −40° | 0.15 | 0.32 | 18,400 |
| −40° | 0.20 | 0.57 | 16,000 |
| −40° | 0.29 | 1.77 | 15,100 |

The above data show that the rate of polymerization is dependent somewhat on temperature but more importantly on the amount of catalyst used.

EXAMPLE 3

Isobutylene was continuously fed to a five gallon reactor provided with an external cooling jacket. Polymerization temperatures are maintained from −40° to −58° F. by circulating precooled methyl ethyl ketone through the jacket, during the course of the reaction. A solution of polymer in isobutylene was continuously withdrawn from the reactor and finely divided solid aluminum chloride was added at the beginning and intermittently thereafter to maintain conversion. Temperature control was satisfactory throughout the run and there was no buildup of poisons in the system as evidenced by a constant molecular weight product. There was no indication of reactor fouling. The following data were obtained.

Equipment ..................... 5 gallon reactor.
Catalyst ...................... Solid AlCl₃.
Feed Rate ..................... 3 gals./hr. of isobutylene.
Catalyst Efficiency ........... Approx. 500 lb. polymer/lb. AlCl₃

| Time, hrs. | Temp., ° F. | Conversion Percent Polymer in Effluent | Molecular Weight of Polymer |
|---|---|---|---|
| 2 | −46 | 8 | 17,500 |
| 4 | −46 | 12 | 17,500 |
| 6 | −44 | 22 | 15,200 |
| 8 | −40 | 25 | 15,000 |
| 10 | −46 | 32 | 14,000 |
| 12 | −50 | 28 | 14,000 |
| 16 | −46 | 36 | 15,500 |
| 20 | −49 | 36 | 15,500 |
| 24 | −40 | 23 | 17,000 |
| 28 | −44 | 33 | 16,000 |
| 32 | −43 | 29 | 16,000 |
| 36 | −49 | 24 | 17,000 |
| 40 | −46 | 32 | 16,000 |

The above data show that there is no change in molecular weight in going from 8 to 36% conversion.

EXAMPLE 4

Polymerizations of isobutylene with solid aluminum chloride were made at −22° F. Conversions were carried to the 24% and 54% level followed by immediate chilling to −58° F. to −76° F. with crushed dry ice. The reactor contents were kneaded with a spatula to coagulate the precipitated polymer gel which was then removed from the reactor. The recovered monomer was used as a feed component in subsequent aluminum chloride catalyzed polymerizations. Results of the precipitation step are shown in Table I and the suitability of the reclaimed monomer as a feed component is shown in Table II.

Table I

| Percent Polymer in Liquor Before Precipitation | Percent of Unreacted Monomer Recovered by Precipitation | Percent Decrease in Load on Recycle System | Percent Polymer Solvated in Recovered Unreacted Monomer |
|---|---|---|---|
| 54 | 31 | 31 | 2 |
| 24 | 62 | 62 | 1 |

Table II

| Vol. Percent Recovered Monomer in Polymerization Feed | Mol. Wt. of Polymer Obtained from Polymerization at $-22°$ F. |
|---|---|
| 0 | 19,800 |
| 32 | 21,600 |
| 44 | 19,500 |
| 100 | 21,600 |

The data in the above tables show that it is entirely feasible to separate the bulk of the polymer by precipitation in a continuous process and that the presence of a small amount of low molecular weight polymer in the recycle isobutylene has no effect on the subsequent formation of polymer.

The nature and objects of the present invention having been thus fully set forth and specific examples of the same given, what is claimed as new and useful and desired to be secured by Letters Patent is:

1. Process for polymerizing isobutylene which comprises agitating the isobutylene at a propeller speed of at least about 5000 RPM with .05% to 1.0% by weight of finely divided solid aluminum chloride having a particle size of less than 0.2 mm. at a temperature between $-67°$ F. and $+32°$ F.

2. Process according to claim 1 in which the amount of aluminum chloride is between 0.1 and 0.5 wt. %.

3. Process according to claim 2 in which the agitation is high enough to maintain uniform dispersion of the aluminum chloride.

4. Process according to claim 3 in which the conversion is carried out up to 70%.

5. Process according to claim 3 in which the conversion is carried out to 30 to 50%.

6. Process for continuously polymerizing isobutylene which comprises continuously introducing isobutylene to an agitated mixture of isobutylene at a propeller speed of at least about 5000 RPM and 0.05 to 1.0% by wt. of finely divided solid aluminum chloride having a particle size of less than 0.2 mm., at a temperature between $-67°$ F. and $+32°$ F., continuously withdrawing a solution of polyisobutylene in isobutylene, cooling said withdrawn solution of polymer to a temperature below $-67°$ F. to precipitate the polymer, separating the precipitated polymer from the isobutylene and recycling the isobutylene to the reaction zone.

References Cited in the file of this patent

UNITED STATES PATENTS

| Number | Name | Date |
|---|---|---|
| 2,243,658 | Thomas | May 27, 1941 |